United States Patent
Hafer

[11] 3,716,683
[45] Feb. 13, 1973

[54] PLUG UNIT FOR USE WITH PLUG-IN BUS DUCT

[75] Inventor: Paul M. Hafer, Florence, Ky.
[73] Assignee: Arrow Hart, Inc., Hartford, Conn.
[22] Filed: Aug. 30, 1971
[21] Appl. No.: 176,066

[52] U.S. Cl. ............... 200/50 R, 200/50 A, 200/50 B
[51] Int. Cl. .......................... H01h 9/20, H01h 33/46
[58] Field of Search ................. 200/50 A, 50 B, 50 C; 339/22 B, 34; 179/71

[56] References Cited

UNITED STATES PATENTS 2,902,555  9/1959  Herrmann ......................... 200/50 A
3,339,038  8/1967  Jorgensen et al. ................. 200/50 B Primary Examiner—David Smith, Jr.
Attorney—Edward B. Evans et al.

[57] ABSTRACT

A plug unit comprising an off-on switch and a stab carrier mounted inside of a housing, the housing being adapted for interconnection with a plug-in bus duct and the stab carrier being linearly movable into and out of engagement with the bus duct's busbars after the housing has been mounted to the bus duct. The plug includes a first handle outside the housing that is manually operable for moving the stabs into and out of busbar contact after the housing has been mounted to the bus duct, and a second handle located outside the housing that is manually operable for opening and closing the off-on switch after the housing has been mounted to the bus duct. The first handle is interconnected with safety structure that requires use of both an operator's hands simultaneously to manually extend or retract the stabs into and out of busbar contact, that prevents extending the stabs into busbar contact until the plug unit is fixed to the bus duct in the final operating attitude, that prevents retracting the stabs from busbar contact unless the plug unit is fixed to the bus duct in the final operating attitude, that prevents extending the stabs into busbar contact unless the off-on switch is open, and that prevents retracting the stabs from busbar contact unless the off-on switch is open. The second handle is interconnected with safety structure that prevents opening of the housing's cover unless the off-on switch is open, that prevents closing of the off-on switch when the housing's cover is open, that allows the plug unit to be 'locked out' when desired so as to keep the off-on switch open, and that cooperates with the first handle as described.

15 Claims, 16 Drawing Figures

PATENTED FEB 13 1973
3,716,683
SHEET 1 OF 7
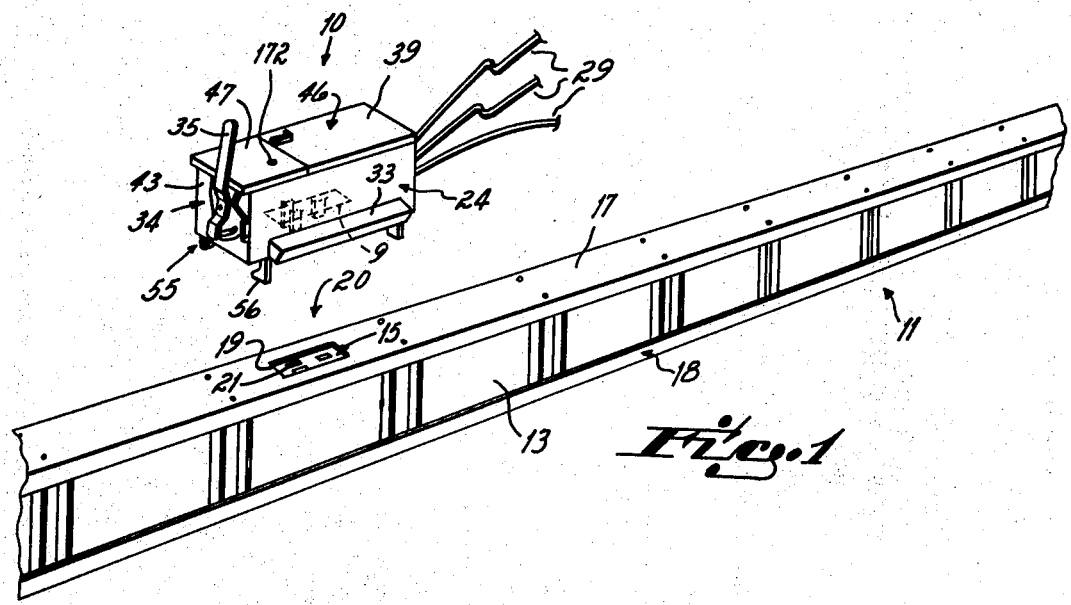
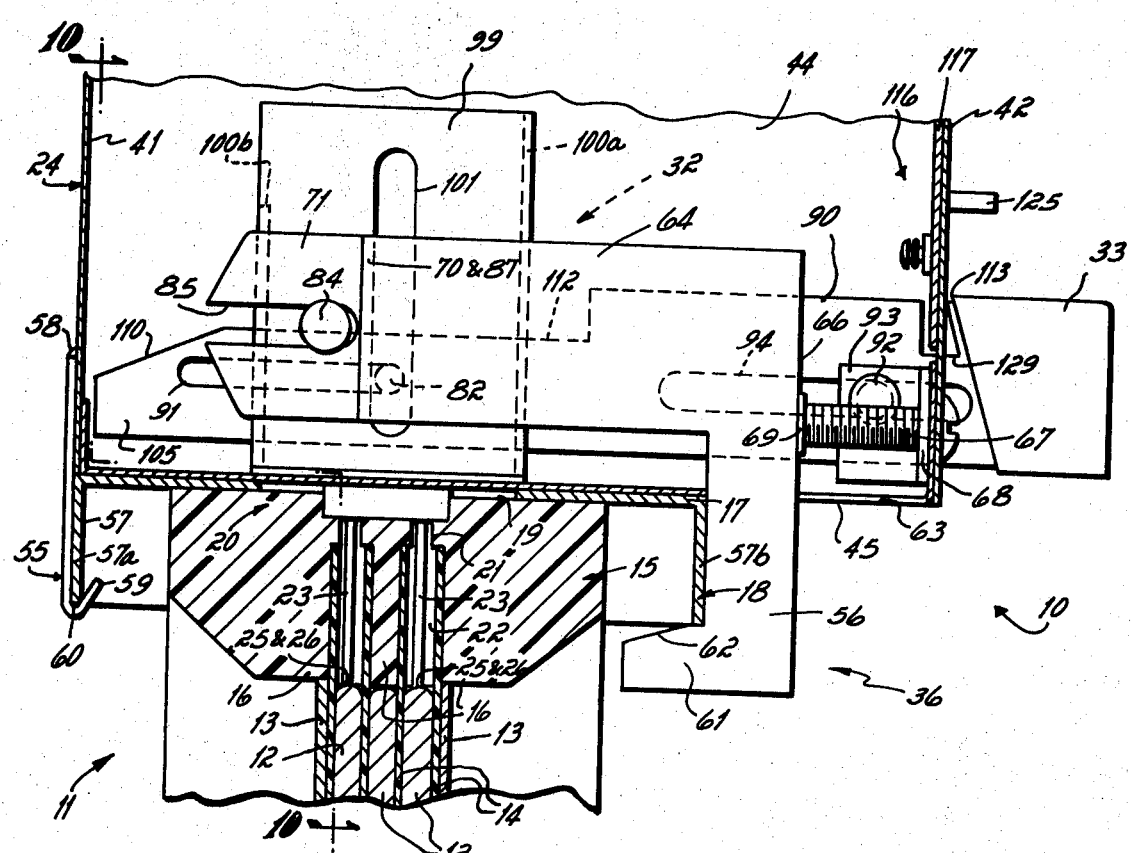
INVENTOR.
Paul M. Hafer
BY
Wood, Herron and Evans
ATTORNEYS

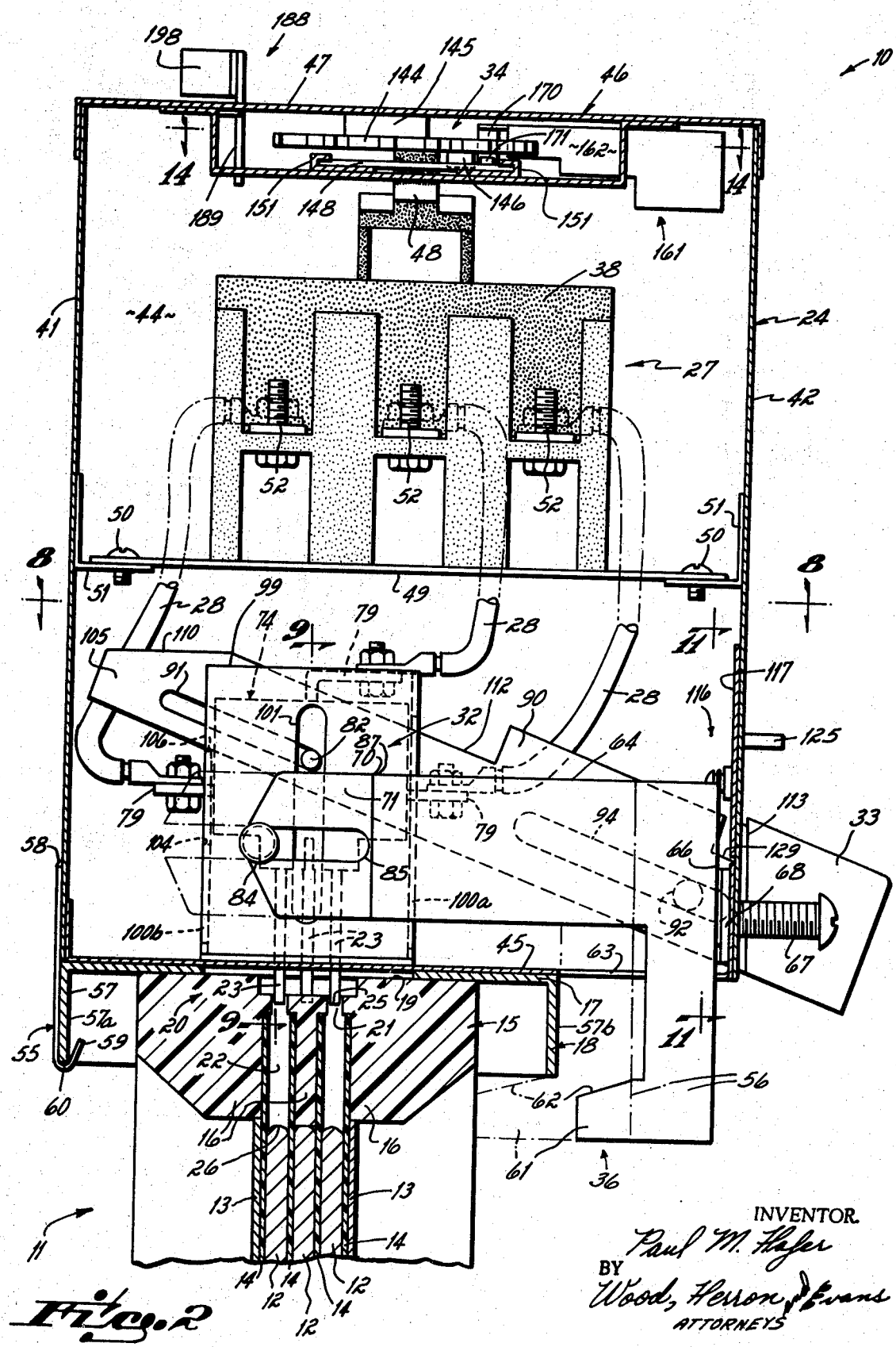

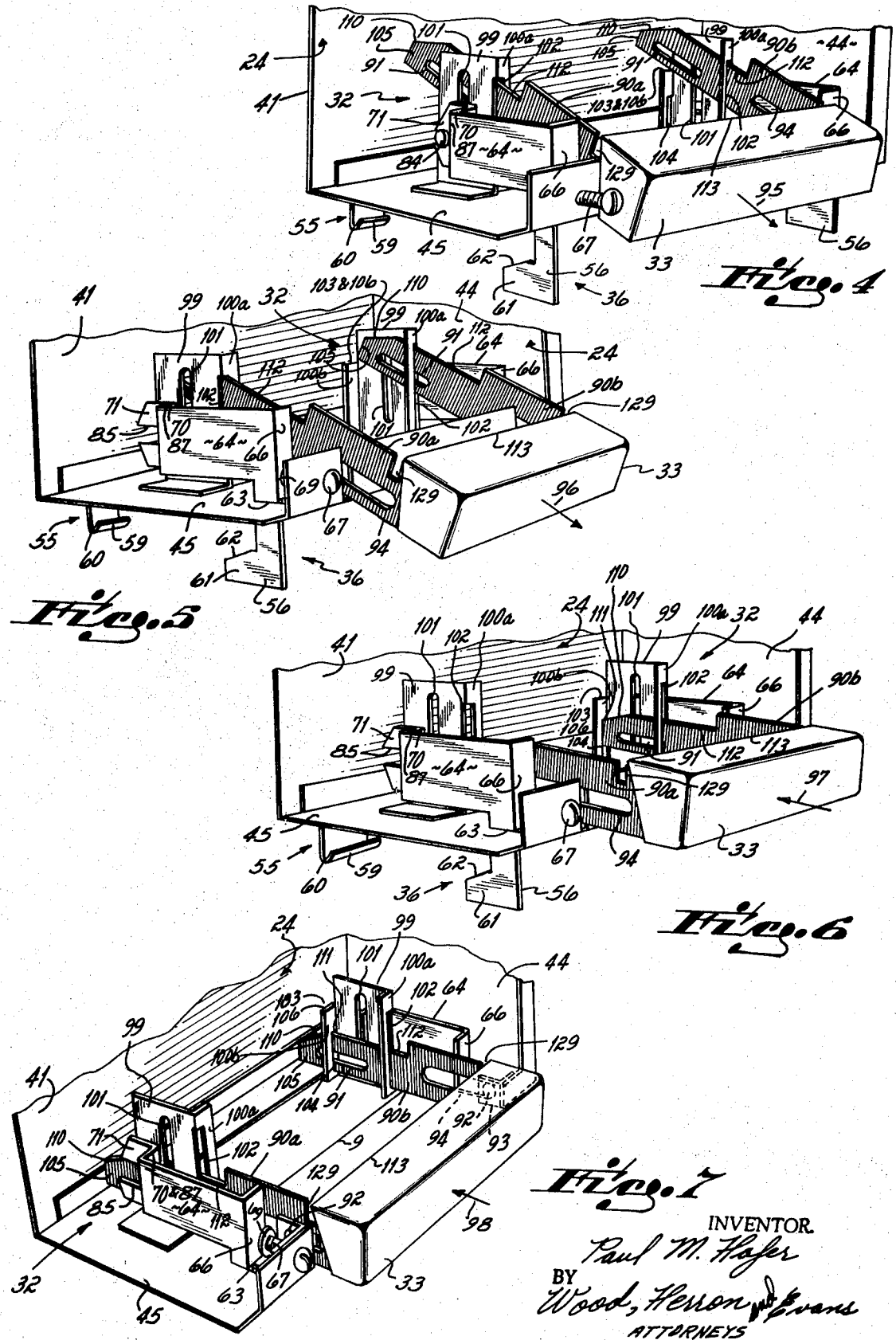

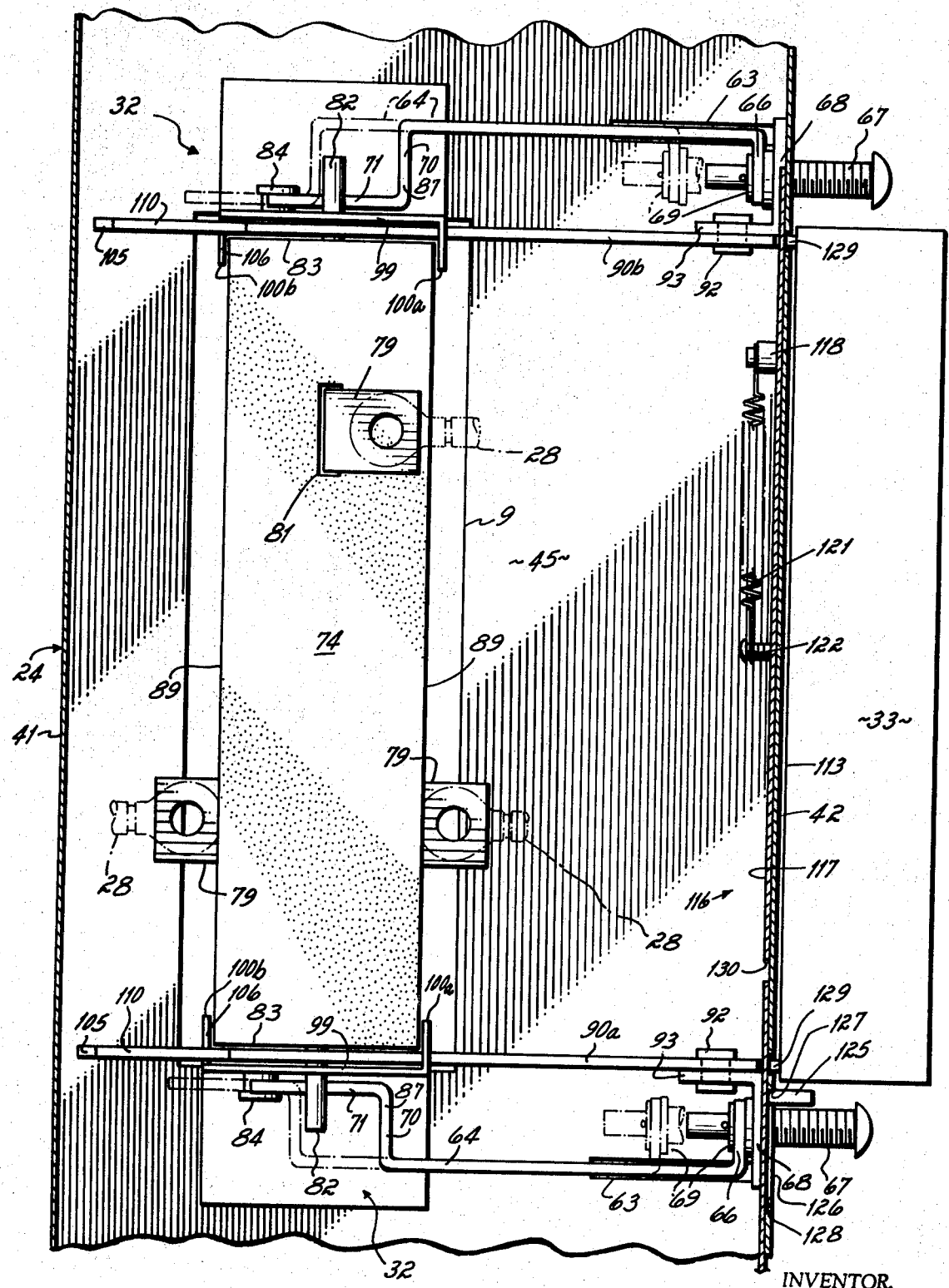

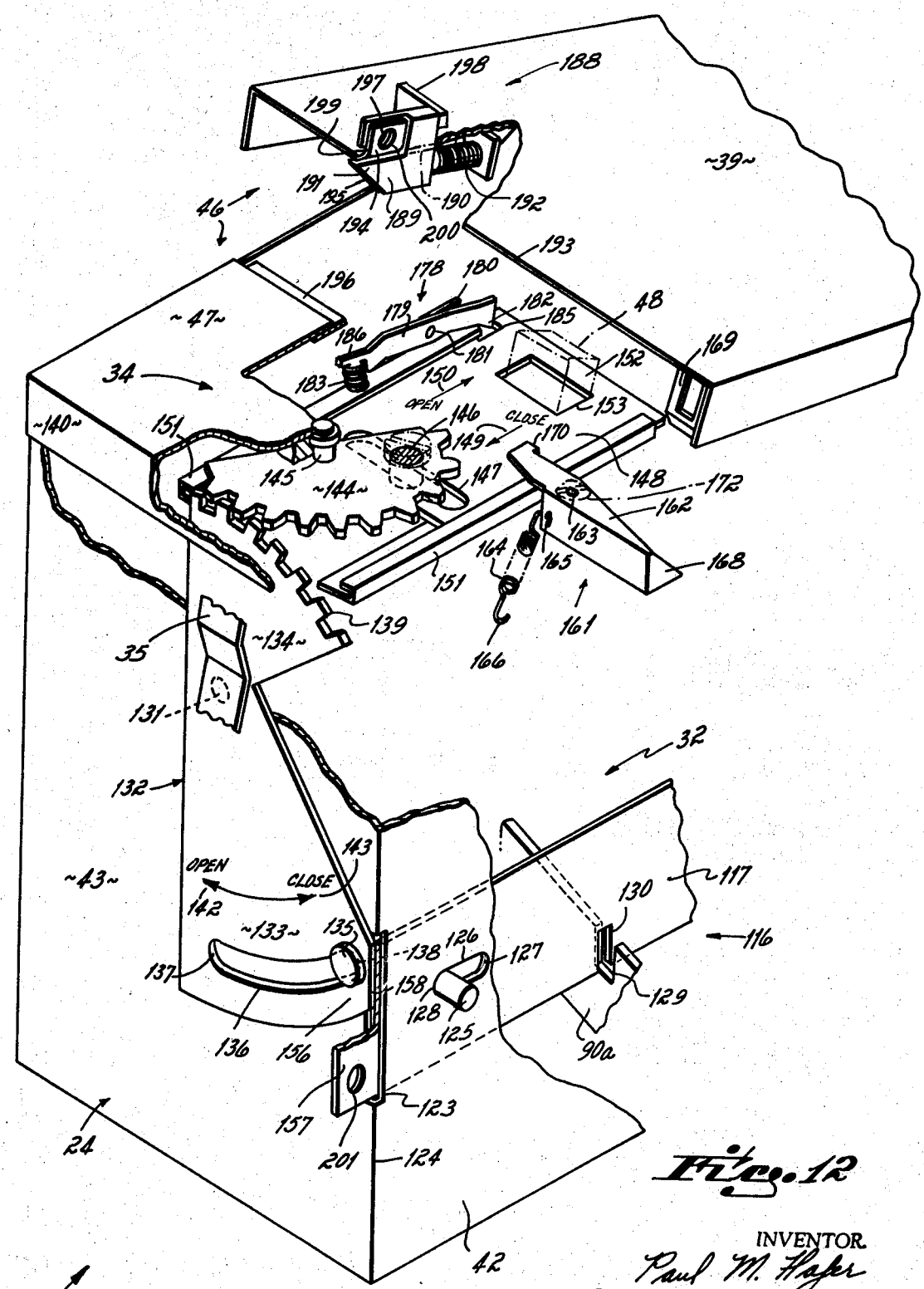

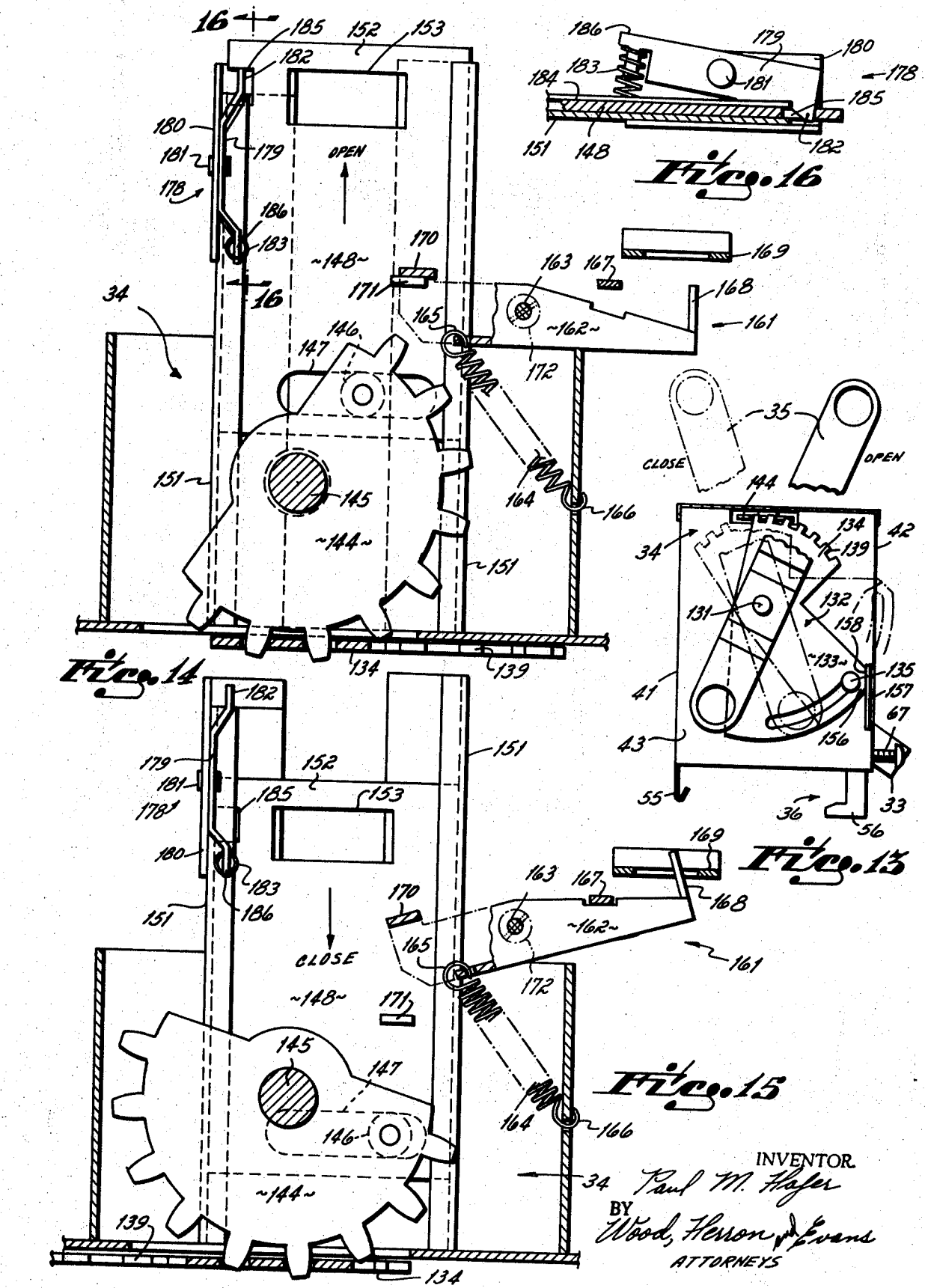

PLUG UNIT FOR USE WITH PLUG-IN BUS DUCT

This invention relates to electric power distribution systems of the bus duct type and, more particularly, relates to a novel plug unit adapted to cooperate with a plug-in bus duct for tapping electric power from the bus duct.

Electric power distribution systems in industrial and commercial buildings utilize busbars to transfer electric power from a substation to a power consuming area. Such power distribution systems are generally made up of a plurality of bus ducts of fixed or variable lengths, successive ducts being connected or interlocked one to the other in end-to-end relation by a suitable busbar coupler system to provide electrical continuity between the power source and the power consuming area.

A bus duct is generally comprised of a group of elongated busbars supported in insulated relation relative one to the other within an elongated housing. One type of bus duct structure that has recently been marketed is that type having a plurality of elongated, flat busbars positioned in side-by-side relation within a housing, the housing having a pair of elongated side walls of a height substantially greater than the width of the busbars. The busbars and housing side walls are separated one from the other only by insulation, the insulation having a thickness less than the thickness of a single busbar. One novel bus duct of this general design is particularly disclosed and set forth in U.S. patent application Ser. No. 70,010, filed Sept. 8, 1970, invented by Paul M. Hafer, and assigned to the assignee of this application.

Once an extended length bus duct run reaches the power consuming area, there must be provided means to tap or take off electric power from the bus duct at desired locations along the bus duct's length in the power consuming area so that same can be transferred to devices such as industrial equipment, heating and/or air conditioning sources, light sources, or the like. Especially designed bus ducts are required when it is desired to take off or tap the electric power being carried by the busbars therein; this type of especially designed bus duct is known as a plug-in bus duct. Thus, a plug-in bus duct is particularly adapted for use in and around a power consuming area. The plug-in bus duct is particularly structured to allow access to the busbars carried within the bus duct so that electrical contact can be made therewith for tapping or taking off power therefrom. One type of plug-in bus duct structure that is particularly useful with the plug unit of this invention is that disclosed in U.S. patent application Ser. No. 176,001, filed on the same day as this application, invented by Paul M. Hafer, and assigned to the assignee of this application.

A plug unit is a device which, generally speaking, is fixed to a plug-in bus duct at a take-off section of the duct, the take-off section being structured so that electrical contact with the busbars is accessible from outside the bus duct's housing. The plug unit carries a series of stabs equal in number to the number of busbars carried by the bus duct, the stabs serving as the contact elements which pass through the plug-in bus duct's take-off section to contact the busbars therein. The stabs are carried in the plug's housing and are electrically connected with an off-on switch, e.g., a circuit breaker, also carried in the plug's housing; but the stabs also extend outside the plug's housing so they can extend into a bus duct's housing to contact the busbars therein. The off-on switch is electrically connected with power leads at one end, the power leads being electrically connected at the other end with the industrial equipment, heating and/or air conditioning sources, light sources, or the like which requires the electrical power in the power consuming area. The off-on switch within the plug unit is usually manually operable by means of a toggle switch which moves between an 'open' position and a 'closed' position, thereby permitting the power leads to be electrically disconnected from the busbars while the stabs are still in electrical contact with the busbars.

In use, and preferably because of safety considerations, a plug's off-on switch is first opened and the plug's housing then fixed to the plug-in bus duct's housing by some clamping means. With one type of plug unit, as the plug's housing is seated on the bus duct's housing preparatory or during clamping the two housings together, the stabs are contacted with the busbars in the bus duct's housing because the stabs are fixed inside the plug's housing. This type of plug unit has two basic constructions, namely, (a) the plug unit is simply manually guided into place vis-a-vis the plug-in bus duct, the stabs contacting the busbars as the plug unit is manually seated in its final, fixed relation with the bus duct (e.g., see U.S. Pat. No. 2,698,925), and (b) the plug unit is first installed in a preliminary position on the plug-in bus duct where the stabs do not contact the busbars, the plug's housing (and, hence, stabs fixed therein) subsequently being moved into final fixed relation with the bus duct where the stabs do contact the busbars (e.g., see U.S. Pat. No. 3,489,983). With the other type of plug unit, the stabs are movable relative to the plug's housing between an extended position and a retracted position. The housing of this type plug unit is first mounted in final fixed relation with the plug-in bus duct (the stabs being retracted during the mounting of the plug's housing to the bus duct's housing) and the stabs are then extended into contact with the busbars (e.g., see U.S. Pat. No. 2,970,245). With both of these basic types of plug units, and for safety reasons as mentioned, the off-on switch is preferably open until the plug's housing has been fixed to the bus duct's housing and until the stabs have made contact with the busbars.

Thus, there are two basic types of plug units now known, namely, one where the stabs are fixed relative to the plug's housing in an extended position, and the other where the stabs are movable relative to the plug's housing between an extended and retracted position. The plug unit of this invention is directed to the latter type of plug unit as I believe that such a type plug unit may well be more desirable from the safety standpoint during initial installation in that the stabs do not contact the busbars, with the potential safety problems inherent in that contact, until after the plug's housing has been fixed or mounted to the bus duct's housing.

Although the movable stab type plug unit is intended for mounting on and demounting from the plug-in bus duct with the stabs retracted and the off-on switch open, this is not always the case under installation conditions. The electrician mounting or demounting the plug unit, for one reason or another, may either fail to open the off-on switch, retract the stabs, or close the cover to the plug's housing during mounting of the plug unit on, or demounting the plug unit from, the plug-in bus duct. Further, although the plug unit's cover (which provides access to the inside of the plug's housing) is not supposed to be opened unless the off-on switch is open according to usual safety rules, such a rule is often violated by those performing maintenance on the plug unit as well as by those mounting or demounting the plug unit. It is, therefore, highly desirable to provide a plug unit for use with a plug-in bus duct wherein the plug unit is provided with a sufficient number of interlocks and safety features so that the plug unit cannot be mounted on or demounted from a plug-in bus duct, or have maintenance performed thereon while installed, unless the plug unit is in a safe (i.e., stabs retracted and/or off-on switch open) attitude.

Therefore, it has been one objective of this invention to provide a plug unit particularly adapted for use with a plug-in bus duct wherein the plug unit includes a housing adapted to be fixed onto the bus duct, stabs movable relative to the housing between extended and retracted positions by a first handle located outside the housing, and an off-on switch movable between open and closed positions by a second handle located outside the housing.

It has been another objective of this invention to provide a plug unit particularly adapted for use with a plug-in bus duct having two handles which function as set forth in the previous objective, the two handles being interlocked one with the other, with the stabs, with the off-on switch, and with the housing's cover, by safety structure that requires use of both an operator's hands simultaneously to manually extend or retract the stabs into and out of busbar contact, that prevents extending the stabs into busbar contact until the plug unit is fixed to the bus duct in the final operating attitude, that prevents retracting the stabs from busbar contact unless the plug is fixed to the bus duct in the final operating attitude, that prevents extending the stabs into busbar contact unless the off-on switch is open, that prevents retracting the stabs from busbar contact unless the off-on switch is open, that prevents opening of the housing's cover unless the off-on switch is open, that prevents closing of the off-on switch when the housing's cover is open, and that allows the plug unit to be 'locked out' when desired so as to keep the off-on switch open.

Other objectives and advantages of this invention will be more particularly set forth and described below in conjunction with the drawings in which:

FIG. 1 is a perspective view illustrating a plug unit incorporating the principles of this invention about to be seated onto a plug-in bus duct;

FIG. 2 is an end view of the plug unit with the end plate removed, the plug unit being seated on the plug-in bus duct but the plug's housing not yet fixed to the bus duct's housing;

FIG. 3 is a fragmentary view similar to a portion of FIG. 2 except that the plug unit is fixed to the bus duct's housing;

FIG. 4 is a perspective view of the plug's stab carrier operating mechanism with the stab carrier removed, the mechanism being shown in the demounted and carrier retracted attitude with the clamps in position to permit seating of the plug's housing on the bus duct's housing;

FIG. 5 is a view similar to FIG. 4 illustrating preliminary movement of the first handle for moving the stab carrier from the retracted attitude to the extended attitude, the clamps having been previously moved so as to fix the plug's housing to the bus duct's housing;

FIG. 6 is a view similar to FIG. 5 illustrating the carrier operating mechanism as the stab carrier is moved toward the extended attitude;

FIG. 7 is a view similar to FIG. 6 illustrating the carrier operating mechanism in final position where the stab carrier is in the extended attitude with the stabs in tight electrical contact on the busbars;

FIG. 8 is a cross-sectional view taken along lines 8—8 of FIG. 2 and further showing the carrier operating mechanism in the FIG. 4 attitude (but with the stab carrier in assembly with the carrier operating mechanism);

FIG. 12 is a partially broken away, perspective, end view of the plug unit illustrating the off-on switch operating mechanism;

FIG. 13 is an end view of the plug unit illustrating the second handle in off-on switch open attitude in solid lines and in off-on switch closed attitude in phantom lines;

FIG. 14 is a cross-sectional view taken along lines 14—14 of FIG. 2 illustrating the off-on switch operating mechanism in the open attitude;

FIG. 15 is a view similar to FIG. 14 but illustrating the off-on switch operating mechanism in the closed attitude; and FIG. 16 is a side view taken along lines 16—16 of FIG. 14 and illustrating a part of the automatic cover catch associated with the off-on switch operating mechanism.

GENERAL FUNCTION AND STRUCTURE

Figure 9:
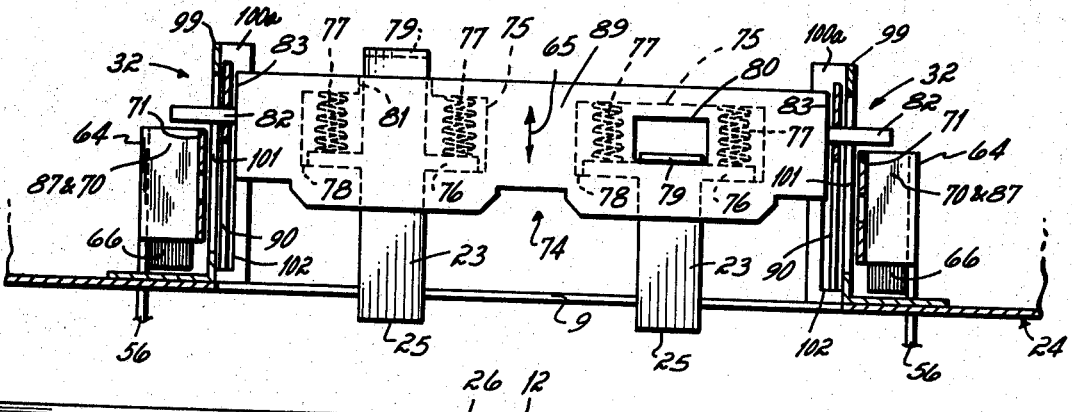
FIG. 9 is a cross-sectional view taken along lines 9—9 of FIG. 2 with the stab carrier in a retracted attitude where the stabs are out of electrical contact with the busbars.

As illustrated in FIG. 1, a plug unit 10 incorporating the principles of this invention is adapted to be used with a plug-in bus duct 11. The plug-in bus duct 11 illustrated is particularly described in U.S. patent application Ser. No. 176,001, filed simultaneously herewith, invented by Paul M. Hafer, and assigned to the assignee of this application; the description of that application is incorporated herein by reference.

As shown in FIGS. 2 and 3, the plug-in bus duct basically includes a series of busbars 12, e.g., three are shown, separated one from the other, and from side walls 13, by flat insulator sheets 14. The insulator sheets 14 are of a width substantially equal to the height of the side walls 13. The bus duct 11 provides a series of take-off sections 20 located along its length, one take-off section being illustrated at 20 in FIGS. 1-3. Each take-off section 20 includes a template 15 made of insulating material located beneath opening 19 in the top 17 of the bus duct's housing 18, the insulator sheets 14 being received in grooves defined between ribs 16 on the underside of the template 15. The template 15 has slots 21 therethrough which, in cooperation with the insulator sheets 14 and ribs 16, define stab chambers 22 that are insulated one from the other and that are adapted to receive stabs 23 of the plug unit 10.

The plug unit 10 of this invention includes stabs 23 and an off-on switch 27 mounted within the plug's housing 24, the off-on switch and stabs being electrically connected through straps 28. The off-on switch 27 may be a circuit braker, a disconnect switch, or any other type switch adapted to be manually operated, and capable of opening and closing an electric circuit. The number of stabs 23 carried by the plug unit 10 is usually equal to the number of busbars 12 carried in the bus duct 11. Power leads 29 extend from the off-on switch 27 to the outside of the plug unit 10, and are of a length sufficient to reach the industrial equipment, heating and/or air conditioning sources, light sources or the like which require the electric power carried by the bus duct 11.

The stabs 23 extend through opening 9 in the plug housing's bottom and are flat and plate-like in configuration. The planes of the stabs 23 are parallel with the planes of the busbars 12 when the plug's housing 24 is in seated relation with the bus duct's housing 18, see FIG. 3. This allows the bottom edges 25 of the stabs 23 to contact electrically the top edges 26 of the busbars 12, thereby establishing electrical continuity between the bus duct 11 and the plug unit 10. The stabs 23 are movable in a linear reciprocatory motion between an extended position (see FIG. 3) where they are in electrical contact with busbars 12 and a retracted position (see FIG. 2) where they are not in electrical contact with busbars 12, after the plug's housing 24 has been positioned in seated relation on the bus duct's housing 18 and fixed thereto.

Such reciprocatory motion of the stabs 23, when desired, is accomplished through use of a stab operating mechanism 32 (see FIGS. 2–10, 12) which is manually operated by a first handle 33 located outside the plug's housing 24. Also the plug unit 10 includes an off-on switch operating mechanism 34 (see FIGS. 2, 3, and 12–16) which is manually operated by a second handle 35 located outside the plug's housing 24. Further the plug unit 10 carries a clamping mechanism 36 (see FIGS. 2–6) by means of which the plug's housing 24 is positively fixed to the bus duct's housing 18 after the plug unit 10 has been positioned in seated relation on the bus duct 11.

Inherent in the stab operating mechanism 32, and interconnected with the first handle 33, is certain safety structure (described in detail below) that requires use of both an operator's hands to extend or retract the stabs 23 into and out of busbar 12 contact, that prevents extending the stabs into busbar contact until the plug unit 10 is fixed to the bus duct 11 in the final operating attitude by the clamping mechanism 36, that prevents retracting the stabs from busbar contact unless the plug unit is fixed to the bus duct in the final operating attitude, that prevents extending the stabs into busbar contact unless the off-on switch 27 is open, and that prevents retracting the stabs from busbar contact unless the off-on switch is open.

Inherent in the off-on switch operating mechanism 34, and interconnected with the second handle 35, is certain safety structure (described in detail below) that prevents opening of the housing's cover 39 unless the off-on switch 27 is open, that prevents closing of the off-on switch when the housing's cover is open, that allows the plug unit 10 to be 'locked out' when desired so as to keep the off-on switch open, and that cooperates with the first handle 33 as described.

SPECIFIC FUNCTION AND STRUCTURE

The plug unit 10 basically includes a housing 24 having side walls 41, 42, end walls 43, 44, bottom wall 45, and top wall 46. The top wall 46 is divided into a fixed section 47 and a pivoted section 39, the pivoted section being the cover of the plug's housing 24 by which the inside thereof can be exposed for visual observation or maintenance when desired or required.

The off-on switch 27 includes an open-close switch block 38 of any type well known to the art; the switch block may be of the type adapted to cooperate with fuses (not shown) if desired, see FIG. 2. The off-on switch 27 has an open-close toggle switch 48, and it is this toggle switch that cooperates with the off-on switch operating mechanism 34 to open or close the off-on switch through use of second handle 35. The off-on switch 27 is fixed to a plate 49 that plate is fixed by screws 50 to angle pieces 51, the angle pieces being welded to opposite sides on the inside of the housing's side walls 41, 42, thereby fixing the off-on switch 27 in position inside the plug's housing 24. The off-on switch 27 is electrically connected from terminals 52 to stabs 23 by straps 28 and also has power leads 29 that are electrically connected therewith at terminals (not shown).

The plug's housing 24 and, hence, the plug unit 10, is fixed to the bus duct's housing 18 by a clamping mechanism that includes a pair of fixed clamps 55 and a pair of movable clamps 56, see FIG. 2. The clamps 55, 56 cooperate with rails 57 of the channel shaped duct housing's top 17. The fixed clamps 55 extend down below the bottom wall 45 of the plug's housing 24, the clamps being positioned adjacent opposite ends 43, 44 of that housing and being fixed to side wall 41 such as by welding at 58. The free end of each of the fixed clamps 55 is turned inwardly and upwardly in a finger-shaped configuration 59, and the clamps extend a distance beneath the bottom wall 45 an amount substantially equal to the depth of the bus duct's rail 57a. This allows a mounted configuration as illustrated in FIGS. 2 and 3. As shown in FIGS. 1 and 2, and in order to mount the plug unit 10 to the plug-in bus duct 11, the plug unit 10 is first simply positioned in seated relation on the bus duct's top 17, it not being fixedly mounted thereto. The plug unit 10 is positioned in that attitude shown in FIG. 2 by tipping it until the fixed clamps 55 grip the bus duct's rail 57a, the housing then being pivoted about point 60 into seated relation with the bus duct's top as illustrated in FIG. 2.

The movable clamps 56 not only function to fixedly mount the plug unit 10 to the bus duct 11, but also incorporate safety structure which cooperates with the stab operating mechanism 32 as will be described in detail below. The movable clamps 56, there being one located toward each end wall 43, 44 of the plug's housing 24, each include a foot 61 having an angulated upper edge 62, see FIGS. 2–6. Each foot 61 extends up through a slot 63 in the housing's bottom wall 45. As illustrated in FIGS. 2, 3, 5–8 and 11, the angle portion of each foot 61 is integral with a safety leg 64 section that extends substantially perpendicular to the linear reciprocatory motion axis 65 of the stabs 23. Each safety leg 64 is provided with a heel 66 at one end which cooperates with a mounting bolt 67, the bolt 67 being threadedly engaged (as at 68) to side wall 42 of the plug's housing 24 and being rotatably fixed (as at 69) to the safety leg's heel 66 so that it can rotate relative thereto. As each mounting bolt is screwed toward the housing's side wall 42, the movable clamp's foot 61 and safety leg 64 will be forced in a direction toward the center of the plug's housing 24, thereby causing the movable clamp's foot 61 to move under bus duct's rail 57b (compare the position of the mounting bolts 67 in FIGS. 2, 4, and 8 with the position in FIGS. 3, 5, 6, and 7) and fix the plug unit 10 to the bus duct 11. If the plug's housing 24 is not quite seated in a perfectly planar relation with the bus duct's top 17, the cam edge 62 on each movable clamp's foot 61 will cam the plug's housing down into tight, fixed relation with the bus duct's housing 18 as the foot is moved inwardly from the position shown in FIG. 2 to the position shown in FIG. 3. It should be noted that operation of the movable clamps 56, i.e., of the movable foot 61 and safety leg 64 at each end 43, 44 of the plug's housing are identical and description of one will serve to describe the other. Further, note that the movable clamps 56 are shown in the 'as manufactured' and 'demounted' attitude in FIGS. 2, 4 and solid line position of 8, and in the 'mounted' attitude where the plug 10 is fixed to the bus duct 11 in FIGS. 3, 5–7 and phantom line position of 8.

Figure 10:
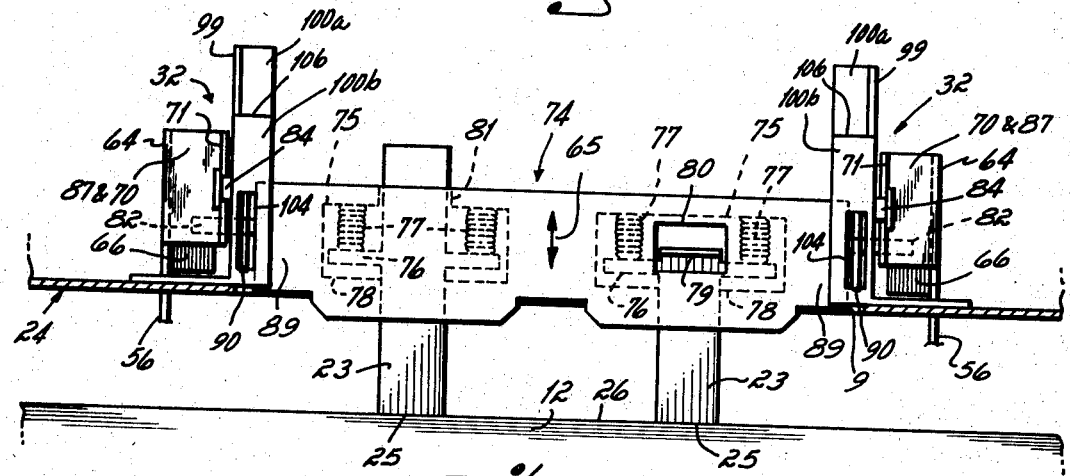
FIG. 10 is a view similar to FIG. 9 and is a cross-sectional view taken along lines 10—10 of FIG. 3 with the stab carrier in an extended attitude where the stabs are in electrical contact with the busbars.
Figure 11:
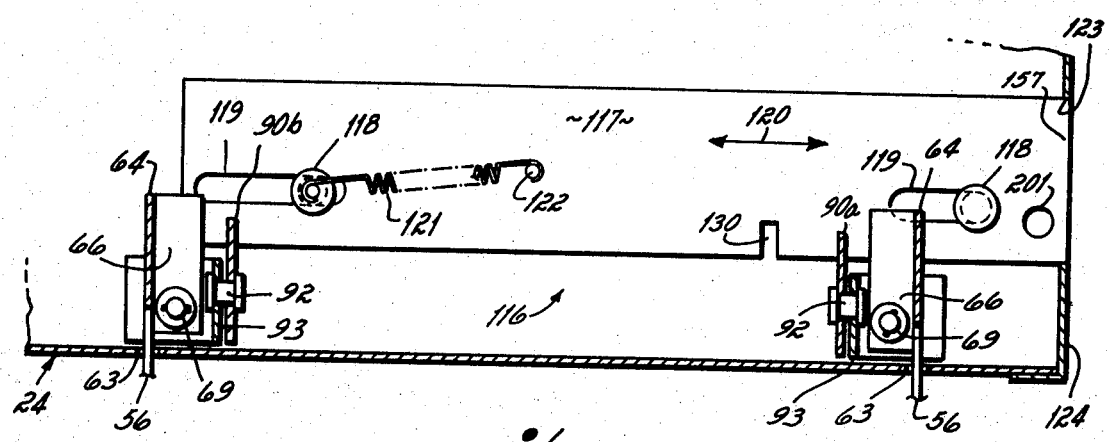
FIG. 11 is a cross-sectional view taken along lines 11—11 of FIG. 2 illustrating an interlock plate.

The stabs 23 are mounted in a stab carrier 74 and extend through opening 9 in the housing's bottom wall 45, see FIGS. 8–10. The stab carrier 74 is fabricated of an insulating material, and the carrier is configured to define T-shaped chambers 75 therein. Each stab 23 is substantially T-shaped in configuration, the stab's cross piece of head 76 being located within the chamber 75 and being spring 77 loaded toward the bottom 78 of that chamber so that the stab's head rests against the bottom of its chamber when the stab and carrier 74 (and, hence, the stabs) are in the retracted attitude, see FIG. 9. In the extended attitude each stab's head is lifted off its chamber's bottom 78 and it is compressed against springs 77, the stab carrier 74 having been forced downwardly by the stab operating mechanism 32 and the downward motion of the stab carrier having been opposed by contact of the stab's bottom edge 25 with its associated busbar's top edge 26 (see FIG. 10); this provides strong, certain contact between busbar 12 and stab 23 to assure good electrical contact each time the stabs are extended into contact with the busbars. Each stab includes a thumb 79 integral therewith, the thumb extending out of the stab carrier 74 through openings 80, 81 in the carrier's side and top walls respectively. The stab straps 28 are connected with the stabs' thumbs 79 at one end and are connected with the off-on switch terminals 52 at the other end, thereby establishing electrical continuity between the busbars and the off-on switch.

As noted, when the movable clamps 56 are moved toward the mounted attitude (shown in FIGS. 3, 5, and 6 and dotted line position of 8) by means of rotating mounting bolts 67, the safety legs 64 are also moved since they are an integral part of the movable clamps. The safety legs 64 each include a crooked thumb 70 having a thumbnail 71. The thumbnail 71 is configured so as to be positioned beneath a pin 82 fixed to the stab carrier 74 (a pin 82 is fixed in each end wall 83 of the stab carrier) when the movable clamp 56 (and, hence, the safety leg 64) is in the 'as manufactured' or 'demounted' attitude, see FIG. 2 and solid line position of FIG. 8; this prevents linear reciprocatory movement of the stab carrier 74 and, hence, of the stabs 23. However, the thumbnails 71 are moved out from underneath pins 82 when the movable clamps 56 (and, hence the safety legs 64) are in the mounted position, see FIGS. 3, 5–7 and phantom line position of FIG. 8; this permits linear reciprocatory movement of the stab carriers 74 and, hence, of the stabs 23.

Each safety leg 64 is guided in its transverse movement (relative to the linear reciprocatory movement of the stab carrier 74) by virtue of a fixed locater pin 84 received in thumbnail's slot 85. Of course, since a stab carrier pin 82 is fixed to each end of the stab carrier 74, and since a safety leg 64 is associated with each carrier pin 82, both of the movable clamps 56 (and, hence, the safety legs 64) must be in the mounted attitude (see FIGS. 3, 5–7 and phantom line position of 8) before the stab carrier 74 (and, hence, the stabs 23) can be moved to the extended attitude from the retracted attitude by the stab operating mechanism 32.

Thus, because of safety legs 64 in combination with movable clamps 56 it will be apparent that the stab carrier 74 (and, hence, the stabs 23) cannot be extended in linear reciprocatory motion from the retracted position (i.e., the 'as manufactured' and 'demounted' attitude) illustrated in solid lines in FIGS. 2 and 8 to an extended position (i.e., the busbar contact attitude) illustrated in FIG. 3 when the plug's housing 24 is not fixed onto the bus duct's housing 18 by the movable clamps 56. This for the reason that thumbnails 71 of the safety legs 64 are positioned beneath the stab carrier's pins 82, thereby preventing movement of the stab carrier to the extended attitude. Only after the thumbnails 71 have moved out from underneath the stab carrier's pins 82 (which occurs by moving the clamps' feet 61 to the mounting position with rail 57b of the bus duct's housing 18 since the safety legs 64 are integral with the movable clamps' feet 61) can the stab carrier 74 move in linear reciprocatory movement. Further, once the stab carrier 74 is in the extended attitude (where the stabs 23 are in electrical contact with the busbars 12 if the plug's housing 24 is fixed to the bus duct's housing) the plug's housing cannot be removed from fixed engagement with the bus duct's housing until the stab carrier is retracted into the plug housing. This for the reason that to remove the plug's housing 24 from the bus duct's housing 18 (and, hence, to break what may be a live electric contact between stabs 23 and busbars 12) the bolts 67 must be rotated to retract the movable clamps 56 from underneath rails 57b of the bus duct's top 17. When attempt at such occurs the safety legs' crooked thumbs 70 prevent same as jog sections 87 of the safety legs 64 will abut or run into the stab carrier's pins 82; this prevents the plug's housing 24 from being removed from fixed engagement with the bus duct's housing 18 unitl the stab carrier 74 has been moved to the retracted attitude (where the stabs 23 are no longer in electrical contact with the busbars 12) such that the thumbnail 71 of each safety leg 64 can once again pass beneath the stab carrier's pins 82.

The stab operating mechanism 32 includes the first handle 33 by which the stab carrier 74 can be linearly reciprocated between the extended and retracted positions from outside the plug's housing 24, see FIGS. 2-10. A carrier locater arm 90 is fixed to the first handle 33 at each end thereof, each carrier locater arm 90 defining a first lost motion slot 91 that cooperates with the pin 82 on the end of the stab carrier 74, see FIG. 2. The carrier locater arms 90 (and, hence, the first handle 33) are each pivotally mounted to the housing's side wall 42 by means of a two-headed pin 92, the pin 92 being fixed to an immobile member 93 (that is, for example, welded to the inside of wall 42) and passing through second lost motion slot 94, see FIGS. 2 and 8. The lost motion slots 91, 94 run lengthwise of the carrier locater arms 90; this permits the first handle 33 to be moved inwardly and outwardly relative to the side wall 42 of the plug housing (see arrows 95-98 of FIGS. 4-7) because of the sliding engagement of stab carrier's pins 82 and of two-headed pins 92 in carrier locater arms slots 91 and 94, respectively. It is by virtue of this inter-engagement between the stab carrier's pins 82 and the first lost motion slots 91 at the end of the carrier locater arms 90 that the stab carrier 74 (and, hence, the stabs 23) is actually moved in and out in linear reciprocatory motion between the extended and retracted attitudes, as will be subsequently explained.

The stab carrier 74 is guided in its linear reciprocatory motion by a carrier guide 99 located at each end wall 83 of the stab carrier, see FIGS. 4-10. The carrier guides 99 are channel shaped members which are positioned so as to face toward one another, see FIGS. 4-7, and then are fixed (such as by welding) to the bottom wall 45 of the plug's housing 24. As the channel shaped carrier guides 99 face toward one another the side walls 100a, 100b thereof embrace the stab carrier's side walls 89 to a limited extent due to the fact that the bed width of the carrier guides 99 is only slightly greater than the width of the stab carrier 74, see FIG. 8. This geometric relationship between stab carrier 74 and carrier guides 99 insures that the linear reciprocatory motion of the stab carrier is in a straight line in and out, thereby preventing cocking or other misalignment of the stab carrier during extension and retraction of the stab carrier (and, hence, of the stabs 23 with respect to the slots 21 in template 15).

The carrier guides 99 are each provided with a vertically oriented elongated opening 101 which, with lost motion slots 91 in arms 90, permit the stab carrier's pins 82 to extend into operating relation with the safety legs 64. The function of the elongated openings 101 is simply to permit the pins 82 to extend beyond the carrier guides 99 so that the pins can cooperate with the carrier locater arms 90a, 90b and the safety legs 64 in the manner aforedescribed. The elongated openings 101 in the carrier guides 99 do not cooperate with the stab carrier's pins 82 to guide the stab carrier 74 in a straight line in its up and down motion, that function being accomplished by channel sides 100a, 100b of each carrier guide 99 in cooperation with side walls 89 of the stab carrier.

Note that the channel side 100a of each carrier guide 99, i.e., that channel side 100 closest to the first handle 33, is provided with a long slot 102 through which its associated carrier locater arm 90 passes, see FIGS. 4-7. These slots 102 serve to aid in guiding the reciprocatory movement of the carrier locater arms 90 and also aid in reinforcing same intermediate their length to prevent buckling. Note also that that channel side 100b each carrier guide 99, i.e., that channel side 100 furthest from the first handle 33, is provided with a notch 103 at the top thereof and a short slot 104 at the bottom thereof, see FIGS. 4-7 and 10. Each carrier loacter arm 90 is of a sufficient length so that the free tip 105 thereof is adapted to rest on the ledge 106 defined by the notch 103 in each carrier guide's channel side 100b when the stab carrier 74 is in the retracted attitude. That is, because the stab carrier's pins 82 are captured in first lost motion slots 91 in the carrier locater arms 90, the stab carrier 74 is located in the retracted attitude when the carrier locater arms 90 rest on the notch ledges 106 as illustrated in FIG. 4. When it is desired to move the stab carrier 74 (and, hence, the stabs 23) from the retracted attitude to the extended attitude (assuming the plug's housing 24 is seated on the bus duct's housing 18 and assuming the movable clamps 56 have been positioned such that the plug's housing is fixed to the bus duct's housing so that linear reciprocatory motion of the stab carrier will not be restricted by thumbnails 71 of the safety legs 64 as shown in FIG. 3) the first handle 33 is drawn outwardly away from the housing's side wall 42 as indicated by arrow 95 in FIG. 4 as allowed by lost motion slots 91, 94. This removes the carrier locater arms 90 from their position of rest on the notch ledges 106. When the carrier locater arms 90 are withdrawn off the notch ledges 106, they can be pivoted downwardly through an acute angle by pivoting them about pins 92 which, it will be recalled, fix the locater arms in functional relation with the plug's side wall 42; compare FIG. 5 to FIG. 6. Because the stab carrier's pins 82 are captured in first lost motion slots 91 in the carrier locater arms 90, the stab carrier 74 is moved down to the extended attitude when the locater arms achieve the FIG. 6 position.

The geometric relationship of the parts is such that, as the carrier locater arms 90 achieve the position shown in FIG. 6 from the position shown in FIGS. 4 and 5, the stabs' bottom edges 25 contact the busbars' top edges 26. Note that the free tip 105 of each carrier locater arm 90 is provided with a cam edge 110. These cam edges 110, when inserted in the slots 104, and in cooperation with the spring 77 loaded stabs 23 mounted in the stab carrier 74, allow the stab carrier to be cammed an incremental distance further to assure good contact of the stabs' edges 25 with the busbars' edges 26. As shown in FIG. 6, and as the tips 105 of the carrier locater arms 90 enter the short slots 104 in the carrier guides 99 as the first handle 33 is pushed in the direction of arrow 97, the cam edges 110 are biased against the top edge 111 of the short slot 104 because the spring 77 loaded stabs 23 now rest on the busbars' top edges 26. The first handle 33 is then manually thrust inwardly in the direction of arrow 98 until it achieves that attitude illustrated in FIG. 7, i.e., until the upper edges 112 of the carrier locater arms 90 are received in and biased upwardly against the top edges 111 of the short slots 104. Thus, as the carrier locater arms 90 move in the short distance between that attitude shown in FIG. 6 and that attitude shown in FIG. 7, cooperation of the locater arms' cam edges 110 with the short slots' top edges 111, in combination with the stab carrier's pins 82 being captured by the first lost motion slots 91 in the carrier locater arms 90, forces the stab carrier 74 down to its final extended attitude. Inward motion of the first handle 33 in the direction of arrow 98 and, hence, the locater arms 90, is limited by abutment of handle edge 113 against the outside of housing's wall 42.

There is one further manual operation that must be performed before the first handle 33 can be operated in accord with FIGS. 4-7 to either extend the stab carrier 74 or retract the stab carrier (assuming that the safety legs 64 are properly located relative to the stab carrier's pins 82). Such involves an interlock structure 116 which, basically, interlocks the stab operating mechanism 32 and the off-on switch operating mechanism 34. This interlock structure 116 includes a first interlock plate 117 that is slidably mounted on the same side wall 42 of the plug's housing 24 as is associated with the first handle 33, but the plate 117 is mounted on the inside thereof, see FIGS. 2, 8, 11 and 12. This first interlock plate 117 is mounted to the side wall 42 by headed pins 118 fixed to the side wall, the pins passing through longitudinally arranged slots 119 so that the interlock plate can slide in the direction shown by arrow 120 in FIG. 11. A tension spring 121 fixed to tit 122 on the interlock plate 117 at one end and fixed to pin 118 at the other end continuously biases the interlock plate into the plug's housing 24. However the interlock plate 117 can be slid outside the plug's housing 24 through slot 123 in corner 124 of the housing by gripping dowel 125 (which is fixed to the interlock plate and which extends outside the plug's housing through side wall slot 126, see FIG. 12). Thus, the interlock plate 117 is reciprocable between an inner position ( as same is biased thereto by spring 121) located by dowel 125 abutting end 127 of the side wall slot 126, and an outer position (as same is manually moved thereto) located by dowel 125 abutting end 128 of the side wall slot 126.

As is illustrated in FIGS. 2, 7, 8 and 12, each of the carrier locater arms 90 has a notch 129 in the upper edge thereof immediately adjacent the first handle 33, the notch in each arm being positioned just inside the housing's side wall 42 when the handle 33 is flush against the side wall (see particularly FIGS. 2 and 8). The interlock plate 117 is positioned on the side wall 42 such that it must reciprocate through these notches 129. When interlock plate 117 is in the position shown in FIG. 8 the carrier locater arm 90-first handle 33 structure cannot be withdrawn or pulled away from the housing's side wall 42, i.e., cannot be moved in the direction of arrow 95 in FIG. 4 because bottom edge of the interlock plate is located in the carrier locater arms' notches 129 and motion of those carrier locater arms is thereby prevented. On the other hand, to permit the carrier locater arm 90-first handle 33 structure to be first withdrawn from and then pushed back toward the housing's side wall 42 (as illustrated in sequence by arrows 95-98 in FIGS. 4-7, respectively) the interlock plate 117 need merely be moved to that attitude illustrated in FIG. 12 by gripping dowel 125 and sliding the plate 117 outwardly so that notch 130 in the interlock plate's bottom edge mates with the notch 129 in carrier locater arm 90a and so that the interlock plates' bottom edge is slid out of notch 129 of carrier locater arm 90b. This interlock plate 117 structure is effective as a safety device in that it prevents the linear reciprocatory motion of the stab carrier 74 (and, hence, of the stabs 23) unless the interlock plate 117 is manually located such that the carrier locater arm 90-first handle 33 structure can be moved as illustrated in FIGS. 4-7. Therefore, upon either extending or retracting the stab carrier 74, an electrician or other operator must use one hand to operate the carrier locater arm 90-first handle 33 structure by pulling and pushing on handle 33 (in accord with FIGS. 4-7), and must use the other hand to move the interlock plate 117 by gripping dowel 125, thereby leaving no hands free for access to the inside of the plug's housing 24 (and the dangers inherent therein) while making or breaking contact of stabs 23 with the busbars 12.

As mentioned, the off-on switch 27 is operated by off-on switch operating mechanism 34 that includes second handle 35 located outside the plug's housing 24, see FIGS. 12-16. The second handle 35 is fixed to a template 132 (pinned to housing's end wall 43 as at 131) which includes a second interlock plate 133 section and a gear plate 134 section, see FIG. 12. The second interlock plate 133 and, hence, the entire template 132, is limited in oscillatory movement by pin 135 fixed to end wall 43 of the plug's housing 24. The pin 135 rides in arcuate slot 136 in the second interlock plate 133 such that limits of the template 132 movement are defined by ends 137, 138 of the arcuate slot 136. The gear plate 134 is provided with gear teeth 139 on an arcuate section thereof adjacent the fixed section 47 of the housing's top cover 46, the gear teeth extending into the plug's housing through an opening defined between edge wall 140 of the fixed section 47 and end wall 43 of the plug's housing 24.

The off-on switch operating mechanism 34 further includes a half-moon gear 144 that is pinned (as at 145) to the underside of the cover's fixed section 47, the gear plate section 134 being positioned to mesh with the half-moon gear 144. The half-moon gear 144 carries an eccentrically mounted pin 146 that depends from the underside thereof into transverse slot 147 of slide plate 148. The slide plate 148 is guided in reciprocatory motion (as shown by arrows 149, 150) by tracks 151 fixed to the underside of the cover's fixed section 47. End 152 of the slide plate 148 includes an opening 153 which fits over the toggle switch 48 of the off-on switch's on/off switch 38. Thus, the half-moon gear 144 is rotated counterclockwise when the second handle 35 is moved so that the template 132 is rotated in the direction of arrow 143, thereby pulling the slide plate 148 in the direction illustrated by arrow 149 to close the off-on switch 27, see phantom line position of template 132 in FIG. 13 and the position of gear 144 in FIG. 15. Rotation of the second handle 35 to the closed attitude of the off-on switch 27 is limited by end 137 of arcuate slot 136 abutting pin 135, thereby assuring that the switch 38 cannot be overrun or the toggle switch 48 broken off. Further, and as viewed in FIGS. 12 and 13, the half-moon gear 144 is rotated clockwise when the second handle 35 is moved so that the template 132 is rotated in the direction of arrow 142, thereby pushing the slide plate 148 in the direction illustrated by arrow 150 to open the off-on switch 27, see solid line position of template 132 in FIG. 13. Again the switch 38 cannot be overrun when moving same to the open position because end 138 of arcuate slot 136 abuts pin 135.

Particularly note that the second interlock plate 133 is provided with a ledge 156 that cooperates with slot 123 in the corner 124 of the plug's housing 24. As illustrated in FIG. 12 and the solid line position of FIG. 13, the off-on switch 27 being open as shown, the ledge 156 of the second interlock plate 133 is aligned with the slot 123 in the housing's corner 124 so that end 157 of the first interlock plate 117 can be manually moved or extended outside of the plug's housing 24 as before described. On the other hand, it will be apparent that when the second handle 35 is moved to phantom line position of FIG. 13, i.e., where the off-on switch 27 is closed, that ledge 156 of the second interlock plate 133 at least partially overlies the slot 123 in the housing's corner 124, thereby precluding movement of end 157 of the first interlock plate 117 outside of the plug's housing 24 through the housing's slot 124. This first 117 and second 133 interlock plate structure effectively interlocks the stab operating mechanism 32 with the off-on switch operating mechanism 34 as it will be recalled that the stab operating mechanism 34 cannot be operated to either extend or retract the stab carrier 74 (and, hence, the stabs 23) unless end 157 of the first interlock plate 117 is extended outside the plug's housing 24 so that notch 130 in the bottom edge of the first interlock plate 117 is aligned with notch 129 in carrier locater arm 90a and so that the end of first interlock plate 117 has been moved out of engagement with notch 129 on the carrier locater arm 90b. When the off-on switch 27 is closed the ledge 156 of the second interlock plate 133 overlies slot 123 in the housing's corner 124, thereby preventing extention of end 157 of the first interlock plate 117 and thereby preventing operation of the carrier locater arm 90-first handle 33 structure. In other words, the off-on switch 27 must be open when the stab carrier 74 is moved to the extended position from the retracted position, and must be open when the stab carrier is moved from the extended position back to the retracted position, for the reason that end 157 of the first interlock plate 117 must be extended through housing's slot 123 past edge 158 of the second interlock plate so that the stab operating mechanism 32 can be actuated.

The off-on switch operating mechanism 34 is also interconnected with the pivotal cover 39 of the plug's housing 24. When the cover is closed a first cover catch 161 prevents the cover 39 from being opened when the off-on switch 27 is closed, see FIGS. 12, 14 and 15. A latch finger 162 is pivotally mounted through post 163 to the underside of the fixed section 47 and is continually biased in the counterclockwise direction (see FIGS. 12, 14 and 15) by spring 164. The top side of the post 163 extends through the fixed cover section 47 so that screwdriver slot 172 thereon is accessible from outside the plug's housing 24 see also FIG. 1. Spring 164 is fixed at one end 165 to the latch finger 162 and at the other end to rib 166 on the underside of the fixed section 47. Movement of the latch finger 162 in the counterclockwise direction is limited by stud 167 that depends from the underside of the fixed section 47. The latch finger 162 includes a bolt 168 at one end adapted to move into and out of a bracket 169 fixed to the underside of the pivotal cover 39, and a thumb 170 at the other end adapted to engage tit 171 integral with the top side of slide plate 148.

As illustrated in FIG. 14, the slide plate's tit 171 engages the latch's thumb 170 as slide plate 148 moves in the direction of arrow 150, i.e., as the off-on switch's switch 38 is thrown toward the opened attitude, thereby causing the latch finger 162 to pivot clockwise which withdraws bolt 168 from out of engagement with the cover's bracket 169. This, of course, allows the cover 39 to be pivoted open only when the off-on switch 27 is open, thereby assuring that flow of power from the busbars 12 to the plug's power leads 29 has been broken whenever the cover is opened. On the other hand, and as illustrated in FIG. 15, as slide plate 148 moves outwardly in the direction of arrow 149 the slide plate's tit 171 is withdrawn from an abutting engagement with the latch's thumb 170, i.e., as the off-on switch's switch is thrown toward the closed attitude, thereby allowing the spring 164 to pivot latch finger 162 counterclockwise until bolt 168 is engaged with the cover's bracket 169. This, of course, prevents the cover 39 from being pivoted open about its hinge (not shown) when the off-on switch 27 is closed, thereby preventing access to the plug unit's interior when the off-on switch is closed. The only exception to this operation is that an electrician, knowing the purpose and function of screwdriver slot 172, may pivot post 163 from outside the plug's housing 24 and thereby disengage latch finger 162 from bracket 169 so as to open cover 39 even if the off-on switch 27 is closed; such may be necessary for certain maintenance purposes. Thus, the first cover catch 161 generally functions to prevent the cover 39 from being pivoted open unless the off-on switch 27 is open (i.e., prevents the cover from being pivoted open when the off-on switch is closed) and, in combination with the first 117 and second 133 interlock plates, functions to prevent the cover 39 from being opened when the stab carrier 74 is being either extended or retracted if the off-on switch is closed.

Once the cover 39 has been pivoted open, a second cover catch 178 prevents the off-on switch 27 from being closed until the cover 39 is closed, it being recalled that the off-on switch must be opened to open the cover in the first instance, see FIGS. 14 and 16. This second cover catch 178 includes a latch finger 179 pivoted to fixed wall member 180 by pin 181. The latch finger 179 includes a tip 182 continuously biased (by spring 183) against slide plate's top surface 184 unless slide plate's notch 185 is positioned therebeneath (which it is when the off-on switch 27 is open). When latch finger's tip 182 is located in the slide plate's notch 185, motion of the slide plate 148 in the direction shown by arrow 149, i.e., motion in the direction required to close the off-on switch 27 through use of second handle 35, is prevented until the pivotal cover 39 is closed. Once the pivotal cover 39 is closed the underside thereof bears against top edge 186 of the latch finger 179 and causes same to pivot about pin 181 against the bias of spring 183. This withdraws latch finger's tip 182 out of the slide plate's notch 185 and allows the slide plate to reciprocate in the direction of arrows 149, 150 through operation of the second handle 35.

A manual cover catch 188 is also provided, that being particularly illustrated in FIG. 12. The manual cover catch 188 includes a latch finger 189 that extends up through slot 190 in the pivoted cover 39. The latch finger's thumb 191 is continually spring 192 biased such that it extends out beyond cover edge 193, it being stopped in the motion direction which it is urged by spring 192 through abutment against upturned flange 194 (flange 194 being fixed to cover 39). When the pivotal cover 39 is closed the thumb 191 is cammed rearwardly (through contact of cam edge 195 with lip 196 of fixed section 47) until the cover is completely closed at which point the thumb 191 extends underneath the fixed section's lip 196 to hold the cover 39 closed. The thumb 191 also includes a gripping tab 198 located above the cover 39 which allows the thumb 191 to be manually withdrawn against the bias of spring 192 so as to open the cover. Further, the thumb 191 also includes a locking tab 199 having a hole 197 aligned with hole 200 in flange 194 when the thumb abuts flange 194. This locking tab 199-flange 194 structure allows a padlock (not shown) to be passed through the holes 197, 200 in the two tabs once they are aligned (and after the pivotal cover 39 has been closed) to lock positively the cover 39 in the closed attitude if that is desirable.

Further, it will be noted that the end 157 of first interlock plate 117 has a hole therein 201. When the interlock plate's end 157 is extended outside the plug's housing 24 as shown in FIG. 12, the circuit breaker 27 must be open as previously described. If a padlock (not shown) is passed through the hole 201 when the first interlock plate 117 is as shown in FIG. 12, the circuit breaker 27 cannot be closed as edge 158 of second interlock plate 133 abuts the side of the first interlock plate and refuses to permit the template 132 to be turned counterclockwise by the second handle 35. This effectively 'locks out' the plug unit 10 whether it is in fixed and mounted relation relative to the bus duct 11 or not. Of course, when the plug unit 10 is in this 'locked out' attitude, and when the plug unit is fixed and mounted on the bus duct 11, the stab carrier 74 may be linearly reciprocated between extended and retracted positions if desired because notches 129 on the carrier locater arms 90 are aligned in the first interlock plate 117 as previously described. Further, it is possible to mount or demount the plug unit 10 when it is 'locked out' because the safety legs 64 and the movable clamps 56 are movable to the mounting or to the demounting attitude by manipulation of bolts 67 assuming the stab carrier 74 has been located in the retracted attitude.

Having described in detail the preferred embodiment of my invention, what I desire to claim and protect by Letters Patent is:

1. A plug unit for use with a plug-in bus duct, said plug unit comprising
    a stab carrier mounted in movable relation within said housing, said stab carrier including a series of stabs adapted to protrude outwardly beyond a wall of said housing,
    stab operating mechanism connected with said stab carrier, said mechanism being adapted to extend said stabs into and retract said stabs from electrical contact with busbars in said plug-in bus duct when said plug unit is seated on said bus duct,
    a first handle located outside of said housing and connected with said stab operating mechanism, said handle being manually controlled to extend and retract said stabs from outside of said housing,
    an off-on switch mounted in fixed position within said housing,
    off-on switch operating mechanism connected with said off-on switch, said mechanism being adapted to open and close said off-on switch,
    a second handle located outside of said housing and connected with said off-on switch operating mechanism, said handle being manually controlled to open and close said off-on switch from outside of said housing, and
    an interlock mechanism connected with said stab operating mechanism and said off-on switch operating mechanism that prevents extension or retraction of said stabs through manipulation of said first handle unless said off-on switch is open, said interlock mechanism including activation means that requires manual operation simultaneously with manual operation of said first handle in order to extend and retract said stabs when said off-on switch is not 'locked out'.

2. A plug unit as set forth in claim 1 wherein said interlock mechanism also includes lockout means for cooperating with said off-on switch operating mechanism that enables said off-on switch to be 'locked out' when desired by the operator, said carrier operating mechanism being operable to extend or retract said stabs while said off-on switch is so 'locked out' without requiring operation of said activation means by one hand of an operator.

3. A plug unit as set forth in claim 1 wherein said stab carrier includes a pin protruding from at least one end thereof, and wherein said stab operating mechanism includes a carrier locater arm fixed to said first handle, said carrier locater arm extending into said housing, being pivotally connected to said stab carrier's pin, and also being pivotally connected to a pin fixed to said housing, said stabs thereby being movable between the extended and retracted positions by pivoting said carrier locater arm about said fixed pin through manual operation of said first handle.

4. A plug unit as set forth in claim 3 wherein said carrier locater arm defines a lost motion slot within which said stab carrier's pin and said fixed pin are captured, said locater arm being perpendicularly disposed relative to the reciprocation plane of said stabs and being moved in a plane transverse to the reciprocation plane of said stabs to effect reciprocation of those stabs, and including
    stab carrier guide structure adapted to guide said stab carrier in linear reciprocatory motion between said extended and retracted positions.

5. A plug unit as set forth in claim 4 wherein said stab carrier guide structure includes
    an upper edge positioned to cooperate with said carrier locater arm so that when said arm is located thereon said stab carrier is maintained in the retracted position, and a lower edge adapted to cooperate with said carrier locater arm so that when said arm is biased thereagainst said stabs are in said extended position and are intimately contacted with busbars in said plug-in bus duct.

6. A plug unit as set forth in claim 3 wherein said activation means includes a first interlock plate having at least one notch in an edge thereof, said plate being slidable between a position where said plate's notch mates with a notch on said carrier locater arm, thereby allowing said carrier locater arm to be pivoted about said fixed pin so as to move said stabs between extended and retracted positions, and a position where said plate's notch is out of registry with said carrier locater arm's notch, thereby preventing said carrier locater arm from being pivoted about said fixed pin.

7. A plug unit as set forth in claim 6 wherein said first interlock plate is continually biased toward that attitude where it prevents pivotal motion of said carrier locater arm, said plate including a third handle that extends therefrom to the outside of said housing so as to allow said plate to be slid to the mated notch position.

8. A plug unit as set forth in claim 7 including
a second interlock plate connected with said second handle, said second interlock plate allowing said first interlock plate to be slid to the mated notch position only when said second handle is in the attitude where said off-on switch is open.

9. A plug unit as set forth in claim 8 wherein said first interlock plate is adapted to extend through a slot outside said housing in the mated notch position, and wherein said second interlock plate is adapted to overlie said slot through which first interlock plate extends when said off-on switch is closed, thereby allowing extension or retraction of said stabs when said off-on switch is opened and preventing extension or retraction of said stabs when said off-on switch is closed, and including
lockout means on the exposed end of said first interlock plate when same is extended through said slot, thereby allowing said plug unit to be locked out when desired.

10. A plug unit for use with a plug-in bus duct, said plug unit comprising
a clamping mechanism connected with the plug unit's housing by which said housing is fixed to a plug-in bus duct after being positioned in seated relation on said bus duct,
a stab carrier mounted in movable relation within said housing, said stab carrier including a series of stabs adapted to protrude outwardly beyond a wall of said housing,
stab operating mechanism connected with said stab carrier, said mechanism being adapted to extend said stabs into and retract said stabs from electrical contact with busbars in said plug-in bus duct when said plug unit is seated on said bus duct,
a first handle located outside of said housing and connected with said stab operating mechanism, said handle being manually controlled to extend and retract said stabs from outside of said housing, and
first safety structure interconnected with said stab carrier and said clamping mechanism that prevents extension of said stabs unless said plug unit is fixedly mounted to said bus duct after same has been seated on that bus duct, and that prevents demounting said plug unit from said bus duct unless said stabs have been retracted.

11. A plug unit as set forth in claim 10 wherein said clamping mechanism includes
at least one movable clamp mounted adjacent one side wall of said housing, said movable clamp being movable between an outer position where said housing can be positioned in seated relation on said plug-in bus duct and an inner position where said housing is fixedly mounted to said bus duct housing.

12. A plug unit as set forth in claim 11 wherein said first safety structure includes a safety leg interconnected with said movable clamp, said safety leg defining a thumb adapted to reciprocate into and out of the path of at least one pin fixed to said stab carrier, said thumb being positioned underneath said pin when said movable clamp is in the nonclamping attitude so as to prevent extension of said stabs when said plug unit is not mounted to said bus duct, and said thumb being positioned to abut said pin when said movable clamp is in the fully mounted attitude so as to prevent demounting of said plug unit before said stabs are retracted when said plug unit is mounted to said bus duct.

13. A plug unit as set forth in claim 12 including two movable clamps, each having a safety leg interconnected therewith that cooperates with a stab carrier's pin at each end of said stab carrier.

14. In a plug unit for use with a plug-in bus duct, an improvement in that plug unit's off-on switch operating mechanism comprising
toggle switch means movably connected with said off-on switch operating mechanism, between the off-on switch opened and closed attitudes through interconnection with an off-on switch handle located outside of the plug unit's housing,
a first safety catch associated with the plug unit's cover, said first catch having a latch that is biased into locking engagement with said cover when said cover is closed in response to motion of said handle toward the off-on switch closed attitude, and that is biased out of locking engagement with said cover when said cover is closed in response to motion of said handle toward the off-on switch open attitude, and
a second safety catch also associated with the plug unit's cover, said second catch having a latch that is biased into locking engagement with said toggle switch means to prevent motion thereof toward the off-on switch closed attrude when said cover is open, and that is biased out of locking engagement with said toggle switch means to allow motion thereof toward the off-on switch open attitude when said cover is closed.

15. An improvement as set forth in claim 14 wherein said toggle switch means includes a switch plate mounted for sliding motion inside said housing, said slidable switch plate being driven by an eccentric pin independently mounted to a half-moon gear with said half-moon gear being driven by an arcuate gear plate fixed to the off-on switch handle, and wherein said first and second catches cooperate with the position of said switch plate.

* * * * *